March 31, 1942. L. C. BROECKER 2,278,122
PNEUMATIC VALVE
Original Filed Nov. 3, 1939
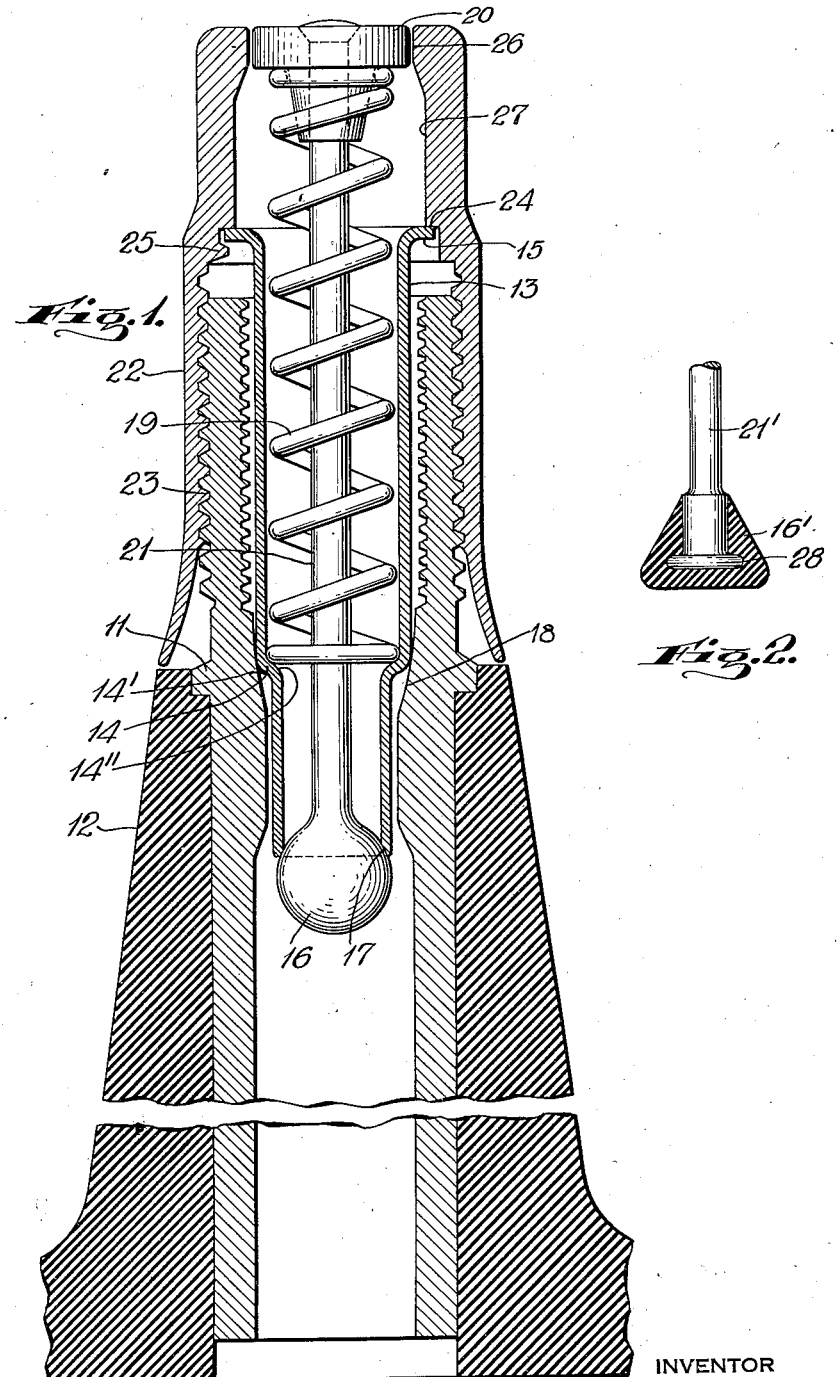
INVENTOR
Lewis C. Broecker
BY Kenyon & Kenyon
ATTORNEYS Patented Mar. 31, 1942

2,278,122

UNITED STATES PATENT OFFICE 2,278,122

PNEUMATIC VALVE

Lewis C. Broecker, Nichols, Conn., assignor to Bridgeport Brass Company, Bridgeport, Conn., a corporation of Connecticut Original application November 3, 1939, Serial No. 302,661. Divided and this application September 19, 1940, Serial No. 357,345

2 Claims. (Cl. 277—42)

This invention relates to pneumatic valves and more especially to bus or truck pneumatic valves which are subjected to high temperatures during operation. The present application is a division of my co-pending application Serial No. 302,661 filed November 3, 1939.

An object of this invention is an all-metal capless tire valve which is effective in operation, is simple to manufacture and assemble, does not deteriorate with age and is unaffected by heat.

In a tire valve embodying the invention, the construction and arrangement of the valve parts is such as to permit the use of a stronger valve spring than is ordinarily used in a tire valve, thereby insuring an airtight seal between the metal members comprising the valve body and valve seat. Also, ample clearance is provided around and through such spring for speedy air passage so that inflation speed of the valve is far greater than that of the conventional valves now in use. The end of the air passageway is normally closed by a plug which is movable by air pressure into a chamber in the passageway of sufficiently larger diameter than the plug to permit free flow of air around the periphery of the plug.

Other objects, novel features and advantages of this invention will become apparent from the following specification and accompanying drawing, wherein:

Fig. 1 is a longitudinal section through a tire valve embodying one modification of the invention, and Fig. 2 is a section embodying a modified form of the valve body of the invention.

In Fig. 1, 11 is a conventional metal valve stem which may, as herein shown, be provided with a rubber covering 12. A barrel 13 is adapted to be positioned within the stem, the lower end of the barrel being reduced in diameter at 14 to form an exterior shoulder 14' and an interior shoulder 14". The upper end of the barrel is provided or formed with an outwardly extending lateral flange 15. A valve body 16 is provided on the lower end of center pin 21 for cooperation with a valve seat 17 formed by the lower end of the barrel 13. This lower end of the barrel is exteriorly coated from a point slightly above the exterior shoulder 14' and around the valve seat 17, with a layer of soft metal, such, for example, as lead or a tin lead alloy. The interior of the stem 11 is provided with a tapered or beveled surfaced portion 18 which constitutes a seat for the exterior shoulder 14'. The soft metal coating provides air-tight joints between the valve body 16 and the seat 17 and also between the tapered portion 18 and the exterior shoulder 14'.

The inner shoulder 14" supports the inner or lower end of a coil spring 19, the upper end of which spring engages a button or disc member 20 fastened to the upper end of the center pin 21. The spring 19 surrounds the center pin 21 and is stronger than the usual valve tire spring, and the use of such spring is made possible because of the extra amount of space provided for the spring by the construction of the valve. In addition, ample clearance is provided through and around the spring for free passage of air through the barrel 13. The lowest coil of the spring is preferably made of slightly larger diameter than the rest, so that it may engage frictionally with the side wall of the barrel 13 while the upper coils are slightly spaced therefrom.

A sleeve or hollow cap 22 is interiorly threaded at 23 to fit the outer threads of the conventional valve stem 11. A shoulder 24 is formed on the inner surface of the cap 22, against which shoulder 24 the flange 15 of the barrel 13 engages, thus forcing the exterior shoulder 14' of barrel 13 against the tapered seat 18 of the stem 11 when the cap 22 is screwed onto such stem. The cap 22 is permanently connected with the barrel 13 for rotation relative thereto by a plurality of lugs 25 formed at intervals by pushing or upsetting the metal on the inside of the sleeve 22 just below the shoulder 24 after the flange 15 has been placed in contact with the shoulder 24.

The button 20 not only serves to transmit the force of the spring 19 to the center pin 21 and valve body 16, but also constitutes a closing plug for the opening 26 in the sleeve 22, thus effectively preventing dust and other foreign matter from entering the sleeve. The bore of the sleeve 22, as compared with its opening 26, is enlarged at 27, thus providing clearance between the periphery of the button 20 and the interior of the bore when the button 10 is moved inwardly so that air may freely flow into and through the sleeve.

While the valve body 16 preferably is spherical and composed of hardened steel, it is to be understood that it may be conical or otherwise suitably shaped and may be composed of any other material having characteristics fitting it for use as the valve body. The button or head 20 is of proper diameter snugly to fit the opening 26 of the sleeve 22 while being freely movable axially thereof.

Fig. 2 shows a modification wherein the valve body 16' is made of rubber or other suitable heatresisting material vulcanized to or otherwise secured to the upset or flanged end 28 of pin 21'.

I claim:

1. In a device of the character described, a tubular member having an external shoulder intermediate its ends, an outwardly extending flange at one end and a reduced portion extending from said external shoulder to the other end of said member and defining an internal shoulder adjacent said external shoulder, a tubular cap rotatably connected to said flanged end of said member and having an interiorly threaded portion adapted to be screwed on to a conventional valve stem of the type having a valve seat therein, the said external shoulder of said member resting on said seat, a spherical valve body adapted to seat against the end of said reduced portion of said tubular member, a pin extending from said valve body through said member and cap and having a head closing the end of said cap, said cap being of larger interior diameter adjacent its end than at its end, and a spring interposed between said internal shoulder and said head, the said spring having its lowermost coil so admeasured as to engage frictionally with the inner surface of said member adjacent said internal shoulder and having its other coils so admeasured as to clear said inner surface.

2. A tire valve comprising a barrel having an external shoulder adapted to engage the internal valve seat of a conventional valve stem, a portion of reduced diameter below said shoulder defining an internal shoulder in said barrel and having a valve seat at its lower end, and an outwardly and laterally extending flange at the upper end of said barrel, a sleeve adapted to threadedly engage a threaded portion of said stem, said sleeve having an internal annular recess intermediate its ends in which said flange fits, and lugs adjacent said recess to retain said flange in said recess while permitting relative rotation between said barrel and said sleeve without permitting relative longtudinal displacement thereof, soft metallic coating on said barrel extending over the portion thereof beginning with its said external shoulder to and including its valve seat, a valve body adapted to co-operate with said coated valve seat, a center pin extending from said valve body through said barrel and said sleeve, a head on said pin adjacent its upper end and so admeasured as to provide a closure for the upper end of said sleeve, and a spring surrounding said pin and extending between said head and the said internal shoulder of said barrel, said spring having an enlarged portion at its lower end resting on said internal shoulder and frictionally engaging the inner wall of said barrel above said internal shoulder.

LEWIS C. BROECKER.